US010656818B1

(12) United States Patent
Winters et al.

(10) Patent No.: US 10,656,818 B1
(45) Date of Patent: May 19, 2020

(54) ANIMATION TO INDICATE SCROLLABLE CONTENT

(71) Applicant: Domo, Inc., American Fork, UT (US)

(72) Inventors: Alan Adams Winters, Lindon, UT (US); SaraJoy Pond, Salt Lake City, UT (US)

(73) Assignee: DOMO, INC., American Fork, UT (US)

( * ) Notice: Subject to any disclaimer, the term of this patent is extended or adjusted under 35 U.S.C. 154(b) by 0 days.

(21) Appl. No.: 14/202,321

(22) Filed: Mar. 10, 2014

Related U.S. Application Data

(60) Provisional application No. 61/780,623, filed on Mar. 13, 2013.

(51) Int. Cl.
*G06F 3/0485* (2013.01)
*G06F 3/0484* (2013.01)
*G06F 3/0488* (2013.01)

(52) U.S. Cl.
CPC .......... *G06F 3/0485* (2013.01); *G06F 3/0488* (2013.01); *G06F 3/04845* (2013.01)

(58) Field of Classification Search
None
See application file for complete search history.

(56) References Cited

U.S. PATENT DOCUMENTS

| 5,787,383 A * | 7/1998 | Moroto | G01C 21/3626 340/990 |
| 8,471,857 B1 * | 6/2013 | Moore | G06F 3/04812 345/473 |
| 2002/0126155 A1 * | 9/2002 | Lin-Hendel | G06F 3/0485 715/785 |
| 2004/0041847 A1 * | 3/2004 | Lai | G06F 3/0485 715/862 |
| 2008/0028289 A1 * | 1/2008 | Hicks | G06F 17/243 715/224 |
| 2008/0046178 A1 * | 2/2008 | Tava | G01C 21/3676 701/431 |
| 2008/0171535 A1 * | 7/2008 | Carmody | H04M 1/72552 455/412.2 |
| 2008/0307363 A1 * | 12/2008 | Jalon | G06F 17/30126 715/835 |
| 2010/0011316 A1 * | 1/2010 | Sar | G06F 9/4443 715/784 |
| 2010/0017872 A1 * | 1/2010 | Goertz | G06F 3/0481 726/16 |

(Continued)

*Primary Examiner* — Beau D Spratt
(74) *Attorney, Agent, or Firm* — Colby Nipper PLLC

(57) ABSTRACT

In various embodiments, an animation is displayed to indicate that displayed content shown within a display area is scrollable. For example, in at least one embodiment, when scrollable content is initially displayed within a display area, an animation is shown in which the display automatically scrolls through all or some of the content, so as to indicate to the user that there is more content to view. In at least one embodiment, the animation is relatively quick and transitory, so that it serves as a brief reminder of the presence of additional off-screen content that the user can scroll to. In at least one embodiment, the animation is only shown for particular content the first time the display renders that content; in another embodiment, the animation is repeated on subsequent re-rendering of the same content.

46 Claims, 12 Drawing Sheets

(56) References Cited

U.S. PATENT DOCUMENTS

| | | | | |
|---|---|---|---|---|
| 2010/0095239 | A1* | 4/2010 | McCommons | G11B 27/036 715/784 |
| 2010/0281421 | A1* | 11/2010 | Lin-Hendel | G06F 3/0485 715/785 |
| 2011/0173569 | A1* | 7/2011 | Howes | G06F 17/30902 715/835 |
| 2011/0214088 | A1* | 9/2011 | Sandru | G09G 5/346 715/785 |
| 2012/0005623 | A1* | 1/2012 | Ishak | G06F 3/0485 715/786 |
| 2012/0042277 | A1* | 2/2012 | Lin-Hendel | G06F 3/0482 715/784 |
| 2012/0166290 | A1* | 6/2012 | Reis | G06Q 30/0269 705/14.66 |
| 2013/0063495 | A1* | 3/2013 | Milan | G06T 3/0012 345/666 |
| 2013/0208291 | A1* | 8/2013 | Ikeda | H04N 1/00411 358/1.13 |
| 2013/0326398 | A1* | 12/2013 | Zuverink | G06F 3/048 715/784 |
| 2014/0132638 | A1* | 5/2014 | Matas | G06T 3/0006 345/660 |

* cited by examiner

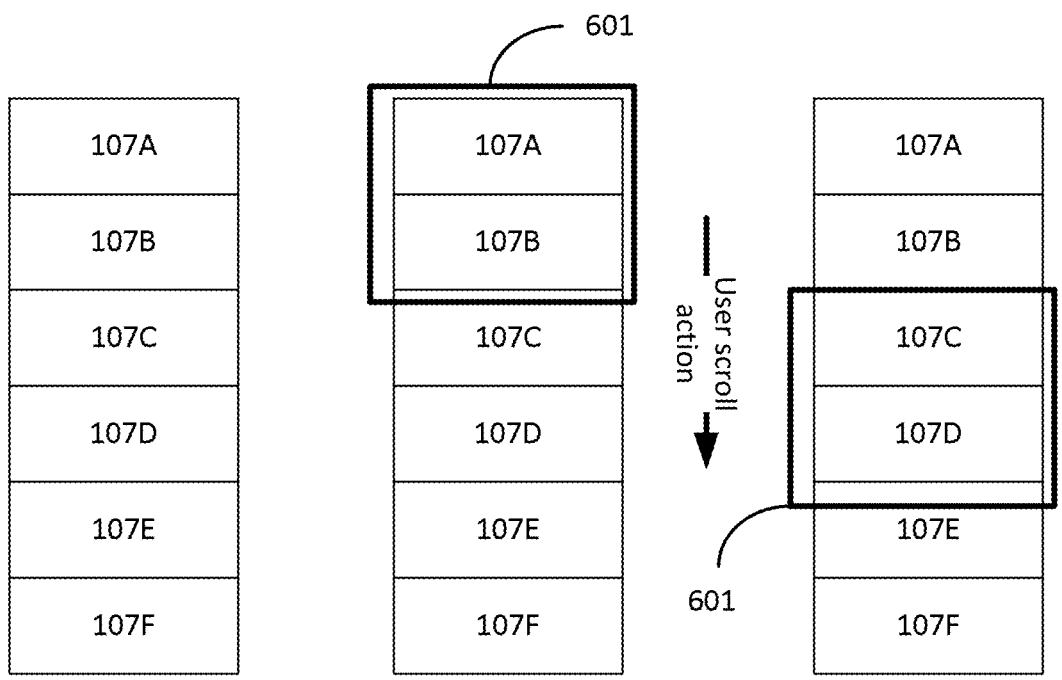

ANIMATION TO INDICATE SCROLLABLE CONTENT

CROSS-REFERENCE TO RELATED APPLICATION

The present application claims priority from U.S. Provisional Application Ser. No. 61/780,623 for "Animation to Indicate Scrollable Content,", filed Mar. 13, 2013, which is incorporated by reference herein in its entirety.

FIELD OF THE INVENTION

The present invention relates to user interfaces in which content can be scrolled by a user.

DESCRIPTION OF THE RELATED ART

Many conventional user interfaces have some form of scrolling operation, which allows users to control which portion of a document (or other item) is displayed in a display area at any given time, or which subset of content items (in a set of content items) are displayed in a display area at any given time. Such scrolling operations are very useful in situations where there is more content than can practicably be displayed in the given display area at any particular time. Many different scrolling mechanisms are available, some of which are adapted to particular systems and devices, such as desktop computers, laptop computers, handheld devices, tablet computers, smartphones, and the like.

In some systems, however, the nature and/or size of the display area makes it difficult or impossible to effectively show user controls for scrolling through content. Existing user interface control elements, such as scroll bars and scroll arrows, or ellipses or other elements that indicate scrollable content, may confuse the user and/or take up valuable display real estate; yet, without such control elements, users may not be aware of which displayed content is scrollable and which is not.

SUMMARY

In various embodiments, an animation is displayed to indicate that displayed content shown within a display area is scrollable. For example, in at least one embodiment, when scrollable content is initially displayed within a display area, an animation is shown in which the display automatically scrolls through all or some of the content, so as to indicate to the user that there is more content to view.

In at least one embodiment, the animation is relatively quick and transitory, so that it serves as a brief reminder of the presence of additional off-screen content that the user can scroll to. In at least one embodiment, the animation is only shown for particular content the first time the display renders that content; in another embodiment, the animation is repeated on subsequent re-rendering of the same content.

In at least one embodiment, the animation ends with an initial portion of the content being shown and available for user interaction (including user scrolling).

The present invention thus provides a simple, intuitive, and non-obtrusive way to inform and/or remind a user that certain displayed content is scrollable. In at least one embodiment, the animation thus is used as a way to introduce content the first time it is displayed. Once the animation is complete, no scrolling elements or controls need be shown, so that the technique of the present invention does not introduce additional clutter and does not occupy valuable screen real estate, but does not necessarily remain on the screen once the animation is complete.

In various embodiments, the transitory animation can be configured by the user and/or by a system administrator to provide the most effective form of reminder without being unduly distracting or obtrusive. For example, the user and/or system administrator can configure any or all of the speed at which the animation occurs, the type of animation, the circumstances under which the animation is displayed, and/or the like.

BRIEF DESCRIPTION OF THE DRAWINGS

The accompanying drawings illustrate several embodiments of the invention. Together with the description, they serve to explain the principles of the invention according to the embodiments. One skilled in the art will recognize that the particular embodiments illustrated in the drawings are merely exemplary, and are not intended to limit the scope of the present invention.

FIGS. 6A through 6C are a conceptual illustration showing scrolling.

DETAILED DESCRIPTION OF THE EMBODIMENTS

Figure 1:
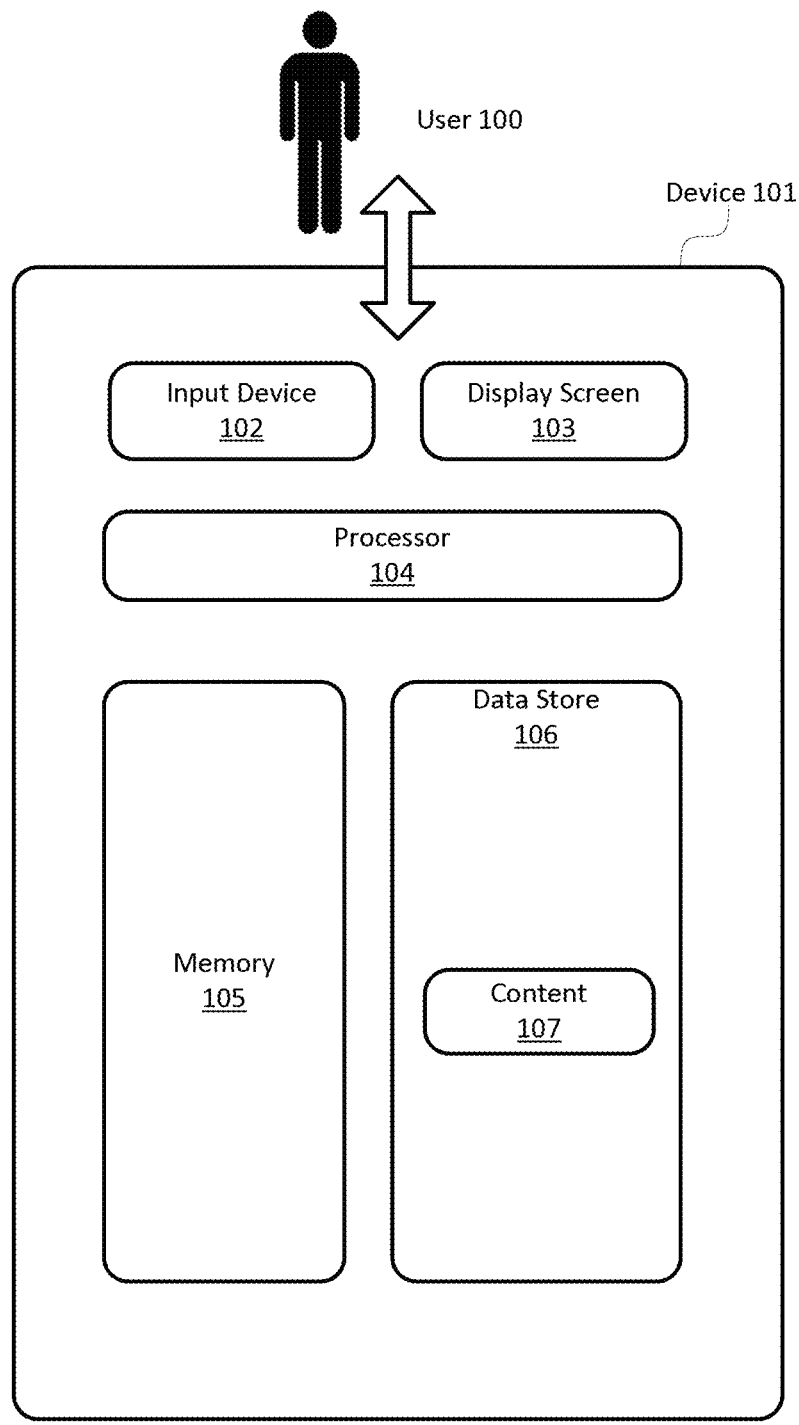
FIG. 1 is a block diagram depicting a hardware architecture for practicing the present invention according to one embodiment.

For illustrative purposes, the systems and methods described and depicted herein may refer to mechanisms for displaying content on a touch screen or other similar device that permits dynamic display of content and responds to direct manipulation of on-screen elements.

The techniques of the present invention are particularly effective in user interfaces that do not otherwise contain a visual indication that content is scrollable. For example, many interfaces for smartphones and tablets are touch-screen interfaces, and the user swipes his or her finger in a horizontal or vertical direction to perform a scrolling operation. This swiping gesture causes the on-screen content to slide in the direction of the gesture, bringing new content onto the screen from the opposite edge of the screen.

One disadvantage of such scrolling techniques in conventional touch-screen devices is that there is, in general, no visible indication as to which content is scrollable and which is not. The user must try a swiping operation, or touch the screen, or perform some other action, before he or she can determine whether additional off-screen content exists that can be scrolled onto the screen. In some systems, a scroll bar or other visual indicator may be shown; however, such elements take up valuable screen real estate (especially for smartphones or other devices having small screens), may confuse some users, and/or may cause the display screen to become aesthetically unappealing and/or cluttered.

Accordingly, the techniques of the present invention are particularly effective in such touchscreen-based systems wherein, apart from the animation described herein, no visual indicator of scrollability is otherwise shown. However, one skilled in the art will recognize that the techniques of the present invention can be applied even if scrollability is shown by a scrollbar or other visual element, and indeed may be used to reinforce scrollability even if it is otherwise evident. One skilled in the art will further recognize that the techniques of the present invention may be implemented in many different situations and in many different ways apart from the exemplary operations described herein.

System Architecture

According to various embodiments, the present invention can be implemented on any electronic device(s) equipped to receive, store, and present information. Such an electronic device(s) may include, for example, one or more a desktop computers, laptop computers, smartphones, tablet computers, or the like.

Although the invention is described herein in connection with an implementation in a computer or smartphone, one skilled in the art will recognize that the techniques of the present invention can be implemented in other contexts, and indeed in any suitable device capable of receiving and/or processing user input. Accordingly, the following description is intended to illustrate various embodiments of the invention by way of example, rather than to limit the scope of the claimed invention.

Referring now to FIG. 1, there is shown a block diagram depicting a hardware architecture for practicing the present invention, according to one embodiment. Such an architecture can be used, for example, for implementing the techniques of the present invention in a computer or other device 101. Device 101 may be any electronic device equipped to receive, store, and/or present information, and to receive user input in connection with such information.

In at least one embodiment, device 101 has a number of hardware components well known to those skilled in the art. Input device 102 can be any element that receives input from user 100, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech.

Data store 106 can be any magnetic, optical, or electronic device for storing data in digital form; examples include flash memory, magnetic hard drive, CD-ROM, DVD-ROM, or the like. In at least one embodiment, data store 106 stores information which may include any include any type of content 107 and that can be displayed and/or interacted with according to the techniques of the present invention, as described below. In another embodiment, content 107 can be stored elsewhere (such as on a remote device, server, or the like), and retrieved by device 101 when needed for presentation to user 100. Content 107 can come from any suitable source and may be of any type, including for example and without limitation: any number of documents, web pages, messages, images, videos, audiovisual items, game screens, and the like. Content 107 can include static items retrieved from data store 106 for display, and/or dynamically generated items, and/or items received by device 101 from some other source, or created by user 100, or the like. In general, the techniques of the present invention operate in connection with content 107 that some form of visual component that can be displayed on display screen 103. Data store 106 can organize and store content 107 using any suitable organizational scheme, including for example in libraries, databases, and/or the like. Content 107 may include one or more individual content items.

Display screen 103 can be any element that graphically displays content 107, and/or some visual output generated from content 107. As is known in the art, content 107 can take up entire display screen 103, or display screen 103 can be (statically or dynamically) divided into regions, windows, cells, or the like, for display of different content items (or different views of the same content item) within these different regions, windows, cells, or the like. The display of content 107 within display screen 103 or within such a region, window, cell, or the like can be scrollable, so as to allow user 100 to use input device 102 to change which content is currently displayed, and/or to alter the manner in which the information is displayed.

One skilled in the art will recognize that the techniques described herein can be implemented in connection with either type of display paradigm: either for scrollable items that take up the entire display screen 103, or those that take up some smaller area of display screen 103. Specifically, for example, a window on display screen 103 can display some portion of content 107, with the techniques of the present invention being used within that window to remind the user that additional portions of the content 107 can be brought into view by scrolling.

Display screen 103 can also display other forms of output, as is known in the art, such as status information, prompts that request information from the user 100, event notifications, overlays, and/or the like. Such additional items can be subject to the scrollability notifications described herein, or they can be presented independently of such techniques.

Processor 104 can be a conventional microprocessor for performing operations on data under the direction of software, according to well-known techniques. Memory 105 can be random-access memory, having a structure and architecture as are known in the art, for use by processor 104 in the course of running software.

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, or by any other appropriate means. This communication with other electronic devices is provided as an example and is not necessary to practice the invention.

In at least one embodiment, data store 106 is detachable in the form of a CD-ROM, DVD, flash drive, USB hard drive, or the like. Content 107 can be entered or retrieved from a source outside of device 101 into such a detachable data store 106, and later displayed after the data store 106 is connected to device 101. In another embodiment, data store 106 is fixed within device 101.

Figure 2:
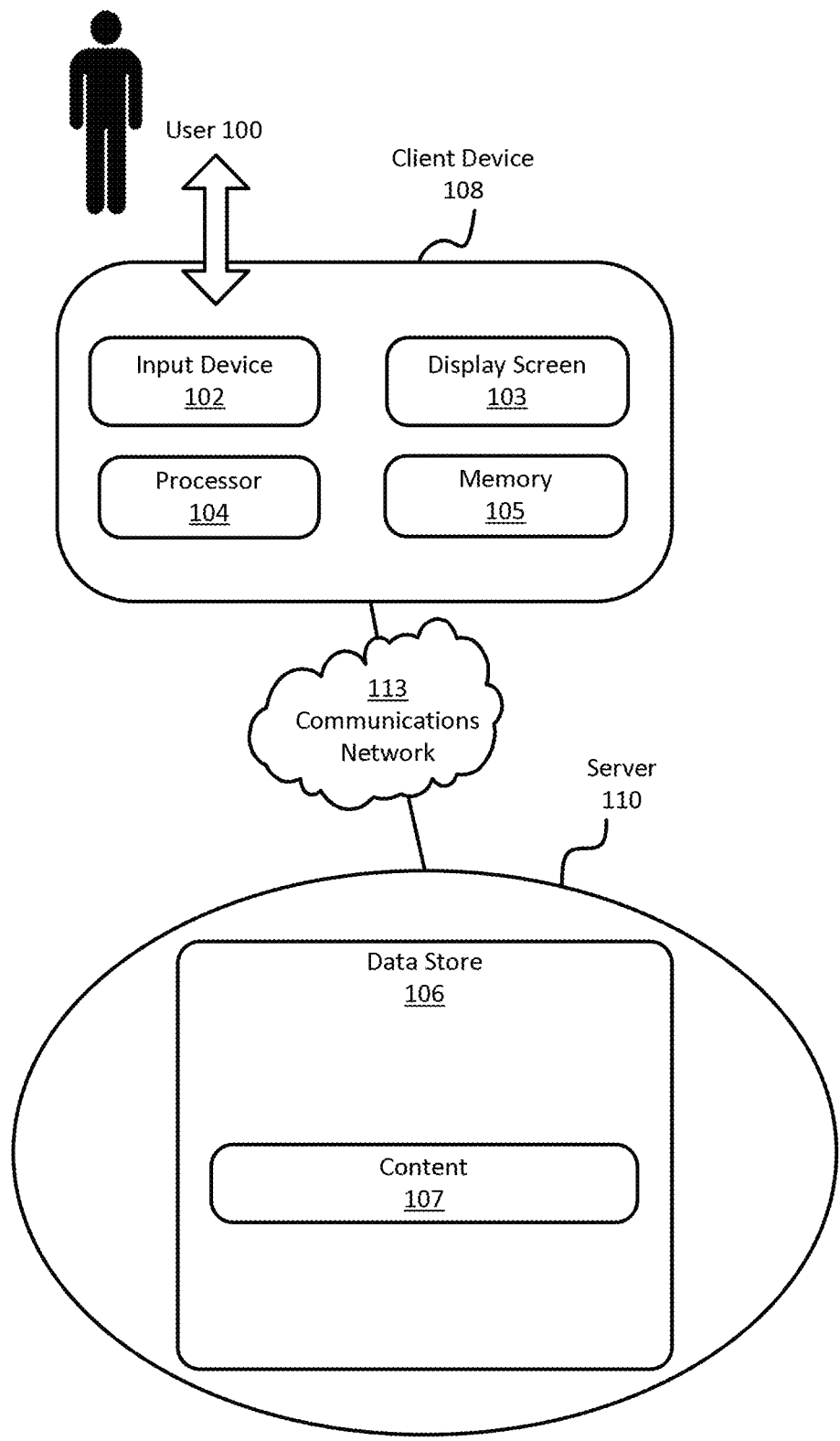
FIG. 2 is a block diagram depicting a hardware architecture for practicing the present invention in a client/server environment, according to one embodiment.

Referring now to FIG. 2, there is shown a block diagram depicting a hardware architecture for practicing the present invention in a client/server environment, according to one embodiment of the present invention. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 110. Content 107 can include any part of such web pages and/or other web-based resources, which may be requested, retrieved, and/or presented using known protocols and languages such as Hypertext Markup Language (HTML), Java, JavaScript, and the like.

Client device 108 can be any electronic device incorporating the input device 102 and/or display screen 103, such as a desktop computer, laptop computer, personal digital assistant (PDA), cellular telephone, smartphone, music player, handheld computer, tablet computer, kiosk, game system, or the like. Any suitable type of communications network 113, such as the Internet, can be used as the mechanism for transmitting data between client device 108 and server 110, according to any suitable protocols and techniques. In addition to the Internet, other examples include cellular telephone networks, EDGE, 3G, 4G, long term evolution (LTE), Session Initiation Protocol (SIP), Short Message Peer-toPeer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 113, and receives responses from server 110 containing the requested data.

In this implementation, server 110 is responsible for data storage and/or processing, and incorporates data store 106 for storing content 107. Server 110 may include additional components as needed for retrieving content 107 from data store 106 in response to requests from client device 108. Server 110 may also include its own processor (not shown in FIG. 2) for processing retrieved content 107 before returning results to client device 108.

In at least one embodiment, content 107 may be organized into one or more well-ordered data sets, with one or more data entries in each set. Data store 106, however, can have any suitable structure. Accordingly, the particular organization of content 107 need not resemble the form in which content 107 is displayed to user 100. In at least one embodiment, an identifying label (and/or other metadata) is also stored along with each content item, to be displayed along with each data entry.

Data store 106 may include one or more data sources, which may be stored at one or more locations and in one or more formats. In at least one embodiment, such data sources are organized in a file system or database within data store 106. Appropriate indexing can be provided to facilitate association and retrieval of particular content items in response to particular requests. Data store 106 may store data using any of a wide variety of data structures known in the database arts.

Content 107 can be retrieved from client-based or server-based data store 106, and/or from any other source. In at least one embodiment, input device 102 is configured to receive data entries from user 100, to be added to content 107 held in data store 106. User 100 may provide such data entries via the hardware and software components described above according to means that are well known to those skilled in the art.

In one embodiment, the system can be implemented as software written in any suitable computer programming language, whether in a standalone or client/server architecture. Alternatively, it may be implemented and/or embedded in hardware.

Method

In various embodiments, the system of the present invention automatically displays an animation to indicate that particular content 107 shown within a display area is scrollable. For example, in at least one embodiment, when scrollable content 107 is initially displayed within a display area, an animation is shown in which the display automatically scrolls through all or some of the content 107, so as to indicate to the user that there is more content 107 to view. In at least one embodiment, the animation is shown immediately upon first display of the content 107, without requiring the user to initiate or activate the animation. For example, the display may automatically scroll through all or some of the content 107 without requiring the user to initiate such a scrolling operation.

For descriptive purposes, the invention is described in terms of a plurality of content items; however, one skilled in the art will recognize that the invention can be implemented in connection with display of a single content item, such as for example a content item that is too large to be displayed in its entirety within a particular display area. Thus, the use of the term "content" or the term "content items" is not intended to be restrictive to a particular embodiment, but is merely intended to be illustrative, with the understanding that "content items" can refer to multiple content items or to portions of a single content item. Content 107 may include, for example, a web page that is too large to fit within a particular display area.

In at least one embodiment, the animation is relatively quick and transitory, so that it serves as a brief reminder of the presence of additional off-screen content that the user can scroll to. In at least one embodiment, the animation is only shown for particular content 107 the first time the display renders that content 107; in another embodiment, the animation is repeated on subsequent re-rendering of the same content 107.

In at least one embodiment, the animation ends with the initial portion of content 107 (i.e., that portion that would ordinarily be presented first) being shown and available for user interaction (including user scrolling).

In at least one embodiment, the animation resembles a quick scroll operation in one direction, performed automatically upon first presentation of the content 107 or upon initial opening of the window or data element. This quick scroll operation provides a preview of the other portions of content 107 that may be available to be displayed if the user chooses to perform a scrolling operation. In at least one embodiment, the quick scroll operation, or other animation, takes place along an axis (either vertical or horizontal) that matches the axis that is available for user scrolling given the context and nature of the display. Thus, if content 107 is horizontally scrollable, the animation may be presented as a quick, automatically activated horizontal scroll operation in a rightward direction that ends with a display of the initial portion of content 107 (e.g., the leftmost part of content 107) on screen 103. Conversely, if content 107 is vertically scrollable, the animation may be presented as a quick, automatically activated vertical scroll operation in a downward direction that ends with a display of the first portion of content 107 (e.g., the topmost part of content 107) on screen 103. In other embodiments, the scroll direction for the animation can be in any direction and along any axis, and need not match the scroll direction for user scrolling.

In at least one embodiment, content 107 can be a set of content items ordered linearly from a first content item to a last content item. The first content item can be the topmost or leftmost item in the set of linearly ordered content items, and the last content item can be the bottom-most or right-most item. In other embodiments, the techniques of the present invention can be used in connection with nonlinear arrangements of content items, such as two-dimensional, grid-based, or other arrangements. For illustrative purposes, however, the techniques of the present invention are described in terms of linearly arranged content items or a linearly arranged series of portions of content 107.

Referring now to FIGS. 6A through 6C, there is shown a conceptual illustration depicting scrolling of linearly arranged content as is known in the art. A set of six content portions 107A through 107F is available for display. For illustrative purposes, all the content portions 107A through 107F are shown as being of equal size; however, this is not necessarily the case. For illustrative purposes, the example depicts six content portions 107A through 107F, which may be separate content items or different portions of a single content item.

Display area 601 (which may represent the entire display screen 103 or some part thereof such as an on-screen window), is large enough to show two portions of content 107 at a time. Accordingly, on initial display, only content portions 107A and 107B are shown within display area 601. Other content portions 107C through 107F are not visible to the user. However, the user can perform a scrolling operation (such as dragging content portions 107 in an upward direction on a touch-screen 103) to cause other content portions 107 to come into view. FIG. 6C depicts a situation in which the user has performed a scroll action to cause content portions 107C and 107D to be displayed.

The techniques of the present invention address the problem that, upon display of content portions 107A and 107B (referred to herein as the initial subset of content 107) in FIG. 6B, the user may not be aware that other portions of content 107 are available for display, particularly if there are no visible tools or controls for scrolling.

Referring now to FIGS. 7A through 7F, there is shown a conceptual illustration showing automatic animation to indicate scrollability among content portions 107, according to one embodiment. Rather than immediately displaying the initial subset of content 107, consisting of portions 107A and 107B, the system of the present invention starts by showing other content portions 107E, 107F (FIG. 7A), then quickly and automatically (i.e., without user action) displaying a transition to slide, or scroll, content 107 through display area 601 until the initial subset (i.e., content portions 107A, 107B) is displayed. This is shown in FIGS. 7B through 7E, wherein several steps of the automatic animation are shown. In operation, however, the animation is displayed in a smooth manner, so that content 107 slides smoothly and quickly through display area 601. In effect, the animation resembles an automatically activated scroll operation.

Figure 8A:
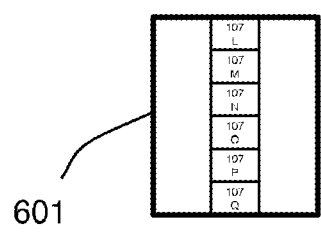
FIGS. 8A through 8C are screen shots depicting an example of an automatic zoom operation to indicate scrollability of content.
Figure 8B:
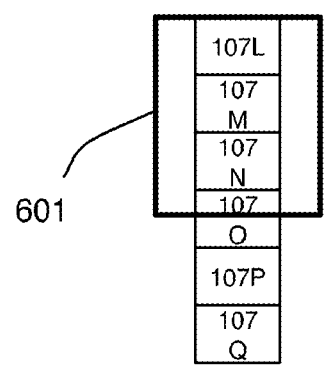
Figure 8C:
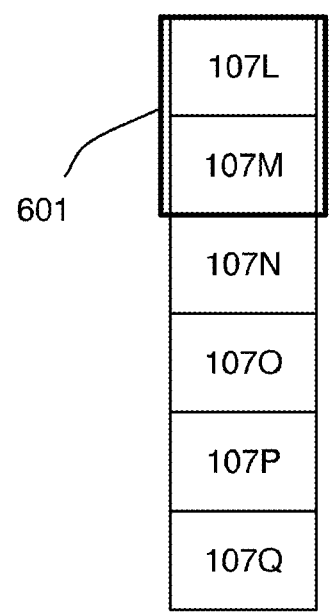

Other types of animation are also possible without departing from the essential characteristics of the invention. Referring now to FIGS. 8A through 8C, there are shown screen shots depicting an example of an automatic zoom operation to indicate scrollability of content. In this example, the animation begins by displaying a zoomed-out view of the content within display area 601, as shown in FIG. 8A, such that the entire content (items 107L through 107Q) is viewable. In at least one embodiment, the largest dimension of the content fills bounds of display area 601. The animation then proceeds as an automatic, continuous zoom operation that continues, for example, until the smallest dimension of the content fits within the bounds of display area 601. This is illustrated in FIGS. 8B and 8C. In this example animation, content items 107N through 107Q to which the user can scroll move outside the bounds of display area 601 during the zoom animation. One skilled in the art will recognize that further variations are possible; for example, the initial view in the animation can show several (but not necessarily all) content items 107, and the view at the completion of the animation can show fewer content items 107 than were shown at the start. Alternatively, the initial view in the animation can show a subset of (but not necessarily all) available content 107, and the view at the completion of the animation can show a smaller subset than was shown at the start.

Figure 7A:
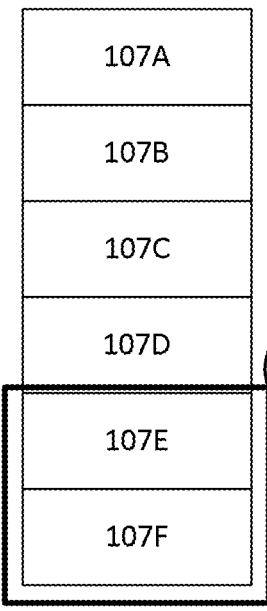
FIGS. 7A through 7F are a conceptual illustration showing automatic animation to indicate scrollability, according to one embodiment.
Figure 7B:
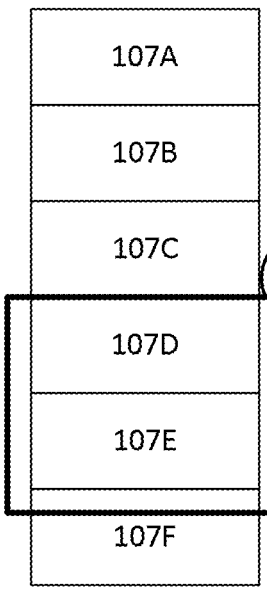
Figure 7C:
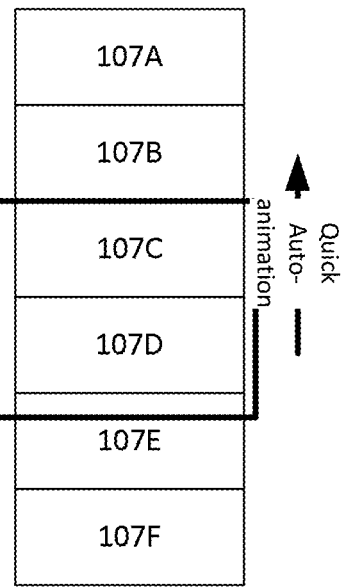
Figure 7D:
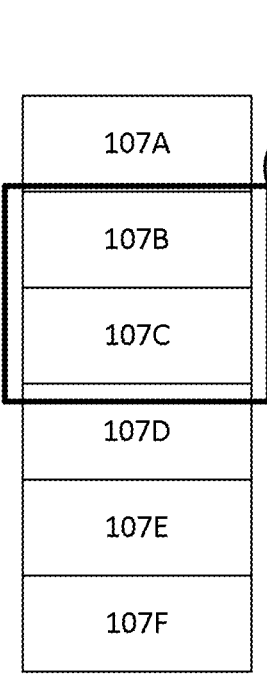
Figure 7E:
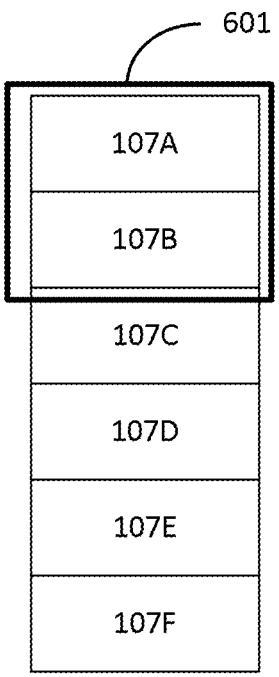
Figure 7F:
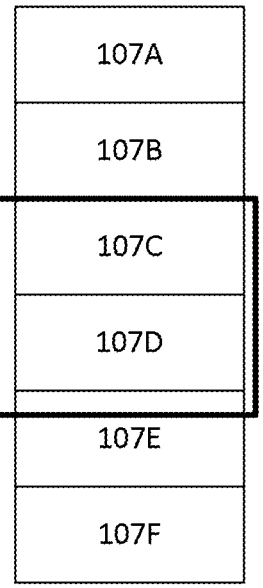

Once the animation is complete, display area 601 shows the initial subset of content 107, consisting of portions 107A and 107B, as shown in FIG. 7E. The user can then perform any desired scroll action, as shown in FIG. 7F wherein the user has performed a scrolling operation to cause content portions 107C and 107D to be displayed.

In at least one embodiment, the user can interrupt the animation at any time by simply initiating a scrolling operation, touching the screen, or otherwise interacting with displayed content 107. For example, in at least one embodiment, if the user touching a displayed content portion as it is moving in the course of the animation, the animation is aborted and the user can interact with the content 107 as normal.

Figure 3:
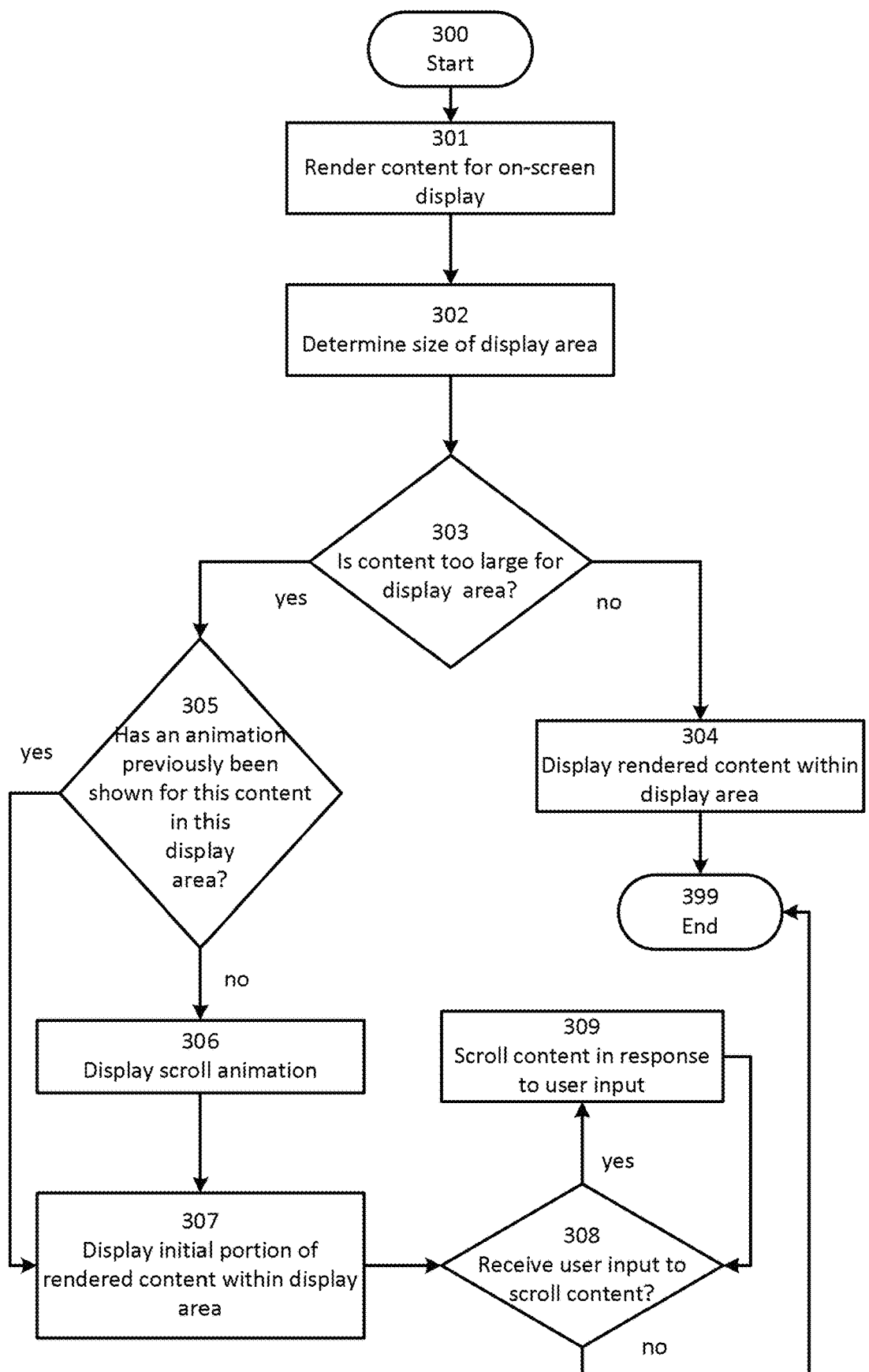
FIG. 3 is a flow diagram depicting a method for practicing the present invention according to one embodiment.

Referring now to FIG. 3, there is shown a flow diagram depicting a method for practicing the present invention according to one embodiment. The steps of the method can be performed by software running on device 101 or client device 108 or some other suitable device, whether in a standalone or client/server environment.

Content 107 is rendered 301 for display using any conventional mechanism. The system then determines 302 the size of the display area 601 in which content 107 is to be displayed (whether this area 601 is the entire display screen 103 or some part thereof such as an on-screen window).

The system then determines 303 whether content 107, if displayed, would be too large to fit in the determined or specified display area 601. In at least one embodiment, this is performed by comparing the size of the area needed for display of content 107 with the size of display area 601. For example, if seven content items are to be displayed, and there is only room in display area 601 for three content items, then a determination is made that content 107 is too large to fit in display area 601. Accordingly, some sort of scrolling mechanism may be provided to allow the user to navigate within content 107 and to control which portion(s) of content 107 are displayed within display area 601 at any given time. The system of the present invention provides a mechanism by which the user can be made aware of such additional portions of content 107 that may not be initially displayed, and to be made further aware that scrolling is available to cause such additional portions of content 107 to be brought within display area 601. As discussed above, the system of the present invention is particularly useful when the scrolling mechanism may not be initially visible on the screen; however, the present invention is not limited to such an environment.

In at least one embodiment, step 303 is performed by determining, based on the size of the specified display area 601 and the amount and size of content 107 available to be displayed, whether an animation to indicate scrolling content is appropriate. In addition, some subset of the content is identified as being the initial portion of content (this may be, for example, the first portion of the content based on recency, importance, alphabetical order, or some other sorting mechanism). The initial portion may include a single content item, several content items, or a portion of a single content item.

If, in step 303, the system determines that there is sufficient space within display area 601 to display all of content 107 that is available to be displayed, then the system displays 304 the rendered content 107 within display area 601, and the method ends 299.

If, in step 303, the system determines that there is insufficient space within display area 601 to display all of content 107 that is available to be displayed, then a scroll animation may be automatically displayed 306 prior to (or concurrently with) the display 307 of the initial portion of the rendered content 107. In at least one embodiment, the system first determines 305 whether an animation has previously been shown for this content 107 within display area 601 (alternatively, it can determine whether this content 107 has been previously displayed within display area 601). If an animation has previously been shown for this content 107, then the scroll animation can be skipped, because the user is presumably already aware that scrolling is available and that other portions of content 107 are available. However, step 305 is optional, so that in some embodiments, the system displays 306 the scroll animation even if it has previously been displayed for this content 107. In at least one embodiment, the user or a system administrator can configure the system as to whether or not the scroll animation should be skipped, and under what circumstances it should be skipped.

In another embodiment, the animation is shown whether or not it has previously been displayed for this content 107, and whether or not content 107 has previously been displayed, but the format of the animation may be altered depending on whether it has previously been displayed. For example, the animation may be sped up, abbreviated, diminished, or otherwise altered if it has previously been displayed. In this manner, the animation can serve as a reminder of scrollability while remaining less prominent than upon first presentation of the animation for this content 107.

If, in step 305, the system determines that a scroll animation should be displayed, then a scroll animation is displayed 306. In at least one embodiment, such an animation is displayed 306 as follows. An initial portion of content 107 (which may be an initial set of content items or a portion of a single content item) is identified as that portion that would normally be displayed first, prior to any scrolling operations; this may be, for example, the topmost or leftmost portion of content 107, or that portion of content 107 that was most recently shown on the screen when this content 107 was last shown. Then, rather than immediately displaying this initial portion of content 107, some portion of content 107 not belonging to the initial subset is rendered first, and an animation is automatically displayed to transition from that portion of content 107 to the initial portion. For example, in at least one embodiment, the last portion of content 107 is displayed first, and the animation transitions from the last portion of content 107 to the initial portion of content 107 (as shown in FIGS. 7A through 7F, for example). However, any suitable animation can be used. In at least one embodiment, for example, the animation includes automatically sliding (or scrolling) smoothly from the last portion of content 107 to the initial portion of content 107, rapidly moving through all intermediate portions of content 107 (if any) in the process. As mentioned above, in at least one embodiment, the animation takes place without the user having to activate or initiate it.

As mentioned above, in at least one embodiment, content 107 can include content items or content portions that are ordered linearly from a first content item or portion to a last content item or portion. The first content item or portion can be the topmost or leftmost item in the set of linearly ordered content items or portions, and the last content item or portion can be the bottom-most or rightmost item or portion.

The scroll animation 306 can include any suitable portion(s) of content 107. Although in some embodiments, the animation 306 starts with the last portion of content 107 and ends with the initial portion of content 107, other embodiments may start with some intermediate portion of content 107 and end with the initial portion of content 107. In at least one embodiment, the system determines where the animation 306 should begin based on any suitable factors, such as how much time is to be spent on the animation, how much scrolling needs to take place to get to the initial portion of content 107, and a desired maximum speed for the animation. For example, in at least one embodiment, the maximum length of the animation can be fixed to some specific duration, such as 0.5 seconds or 1 second. This may be user-configurable, if desired.

In at least one embodiment, the animation 306 is performed at a constant speed. In another embodiment, it may speed up and/or slow down. For example, the animation 306 may be presented so that it gives the illusion of inertia, and/or gradually slowing down, as it reaches its end. Many other such effects are possible.

In at least one embodiment, the animation is accompanied by a distinctive sound, vibration, or other form of non-visual output.

Once the animation is complete, the system displays 307 the initial portion of content 107 within display area 601 and is ready to receive user input to scroll. In at least one embodiment, there is a smooth transition between the end of the animation of step 306 and the display of the initial portion of content 107 in step 307, particularly if the animation ends with the display of the initial portion of content 107. If the system receives 308 user input to scroll displayed content 107, a scrolling operation is performed 309 in response to the user input. Otherwise, the method ends 399.

If, in step 305, the system determines that a scroll animation should not be displayed, the system proceeds directly to step 307.

In at least one embodiment, concurrently with the animation performed in step 306, a scroll indicator is displayed over, or adjacent to, the animating content to indicate the size of the complete set of content 107 as well as how close the animation is to finishing.

In at least one embodiment, the animation performed in step 306 may take place over a predetermined overall duration, regardless of the amount of content 107 being automatically scrolled; thus the automatic scrolling may be more rapid if there is more content 107 to be scrolled. In another embodiment, the animation may be at a predetermined speed, so that it takes longer if there is more content 107 to be scrolled. In at least one embodiment, the duration of the animation may be user-configurable. As mentioned above, in at least one embodiment, the user can interrupt the animation by interacting with displayed content 107, for example by touching or tapping on display screen 103 or performing some other input operation using input device 102. In at least one embodiment, if the animation is interrupted, the scroll position remains at the point where the animation was interrupted, and the user can view and/or interact with displayed content 107 as normal. In another embodiment, if the animation is interrupted, the scroll position immediately moves to display the initial content 107 as would otherwise be displayed at the conclusion of the animation.

In at least one embodiment, the animation performed in step 306 is transitory; once the animation is complete, normal interaction with content 107 can take place.

In at least one embodiment, if the display contains multiple scrollable areas (such as multiple display areas 601 or windows on a display screen), a scroll animation can be displayed concurrently in any or all of the scrollable display areas, if appropriate.

The techniques of the present invention can be implemented in any context in which it is useful to indicate scrollability to the user. For example, the present invention can be implemented in a context in which a single document, web page, or other content item is being displayed, and the user can scroll to different portions of that content item. Alternatively, the present invention can be implemented in a context in which a set of content items are available to be displayed, and the user can scroll to control which subset of the set is displayed at any given time.

As mentioned above, the techniques of the present invention can be implemented in any suitable operating system and/or software application, whether for a desktop computer, laptop computer, tablet, kiosk, smartphone, handheld device, or any other suitable electronic device. In various embodiments, the techniques of the present invention are implemented in connection with any or all of: the iOS operating system, available from Apple Inc. of Cupertino, Calif.; the Android operating system, available from Google, Inc. of Mountain View, Calif.; the MacOS operating system, available from Apple Inc. of Cupertino, Calif.; or the Windows operating system, available from Microsoft Corporation of Redmond, Wash.

Example: Presentation of Scrollable Content on Multi-Pane Display

Referring now to FIGS. 4A through 4D, there are shown screen shots depicting examples of the scroll animation step 306 of the present invention according to one embodiment. These Figures depict an example in which content items 107G through 107K are to be displayed in display area 601, and an animation is displayed to indicate that the content items 107G through 107K are scrollable.

Figure 4A:
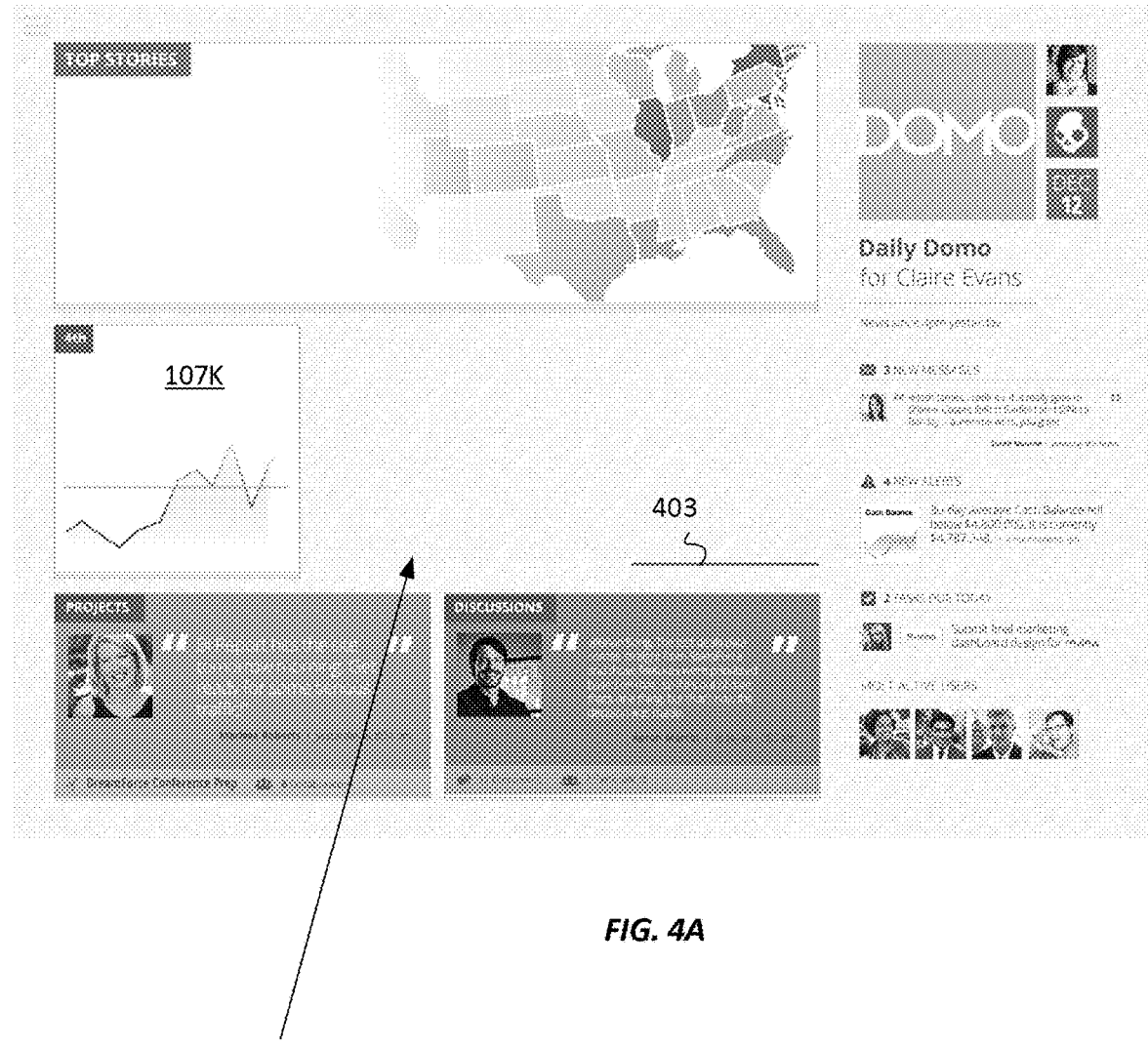
FIGS. 4A through 4D are screen shots depicting an example of operation of the present invention in a display of business intelligence information on a computing device, according to one embodiment.

In FIG. 4A, the animation begins. The last content item 107K in the set of content items is displayed first, within display area 601. Scroll indicator 403 is at the rightmost position within display area 601, to indicate that content item 107K is the rightmost (last) in the set.

Figure 4B:

In FIG. 4B, the animation continues. Content item 107K smoothly slides over to the right to make room for content item 107J, which represents the second-last content item in the set. As content items 107J and 107K move to the right, scroll indicator 403 moves to the left.

Figure 4C:
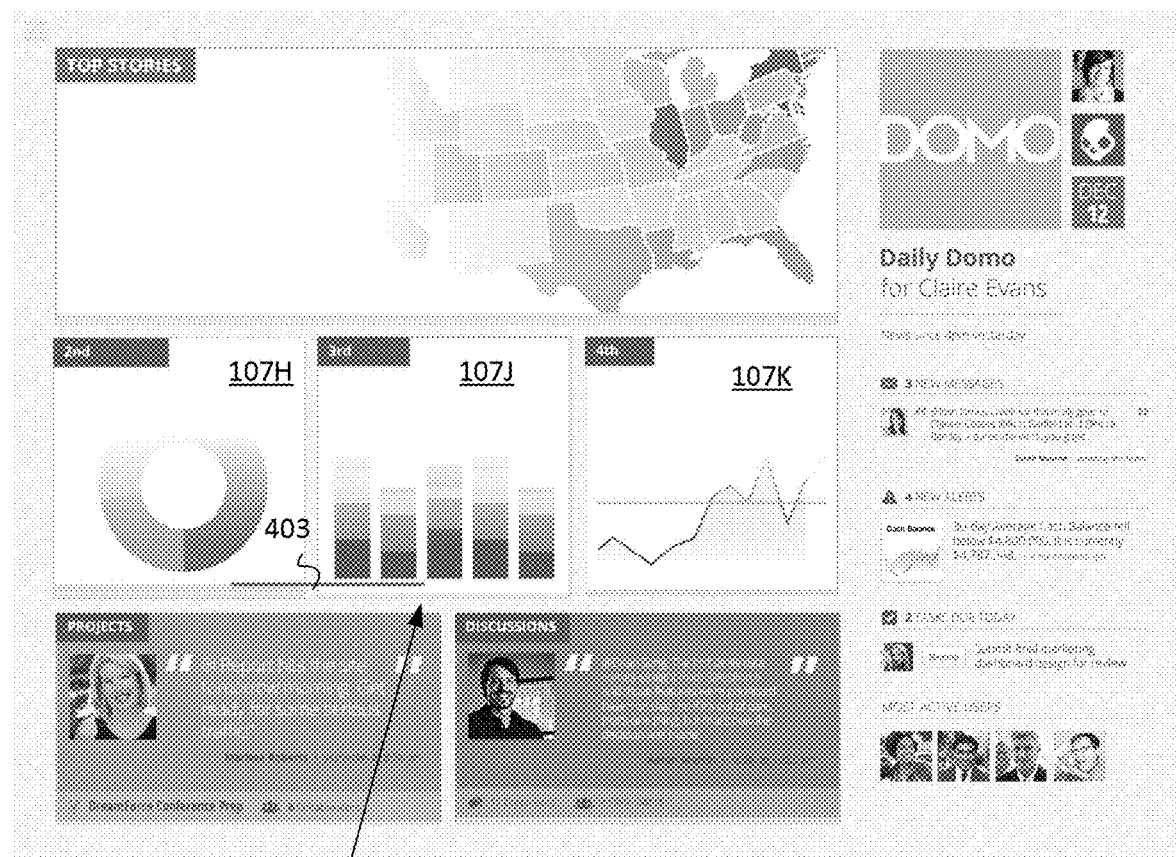

In FIG. 4C, the animation continues. Content items 107J and 107K continue to smoothly slide over to the right to make room for content item 107H. As content items 107H, 107J, and 107K move to the right, scroll indicator 403 continues to move to the left.

Figure 4D:
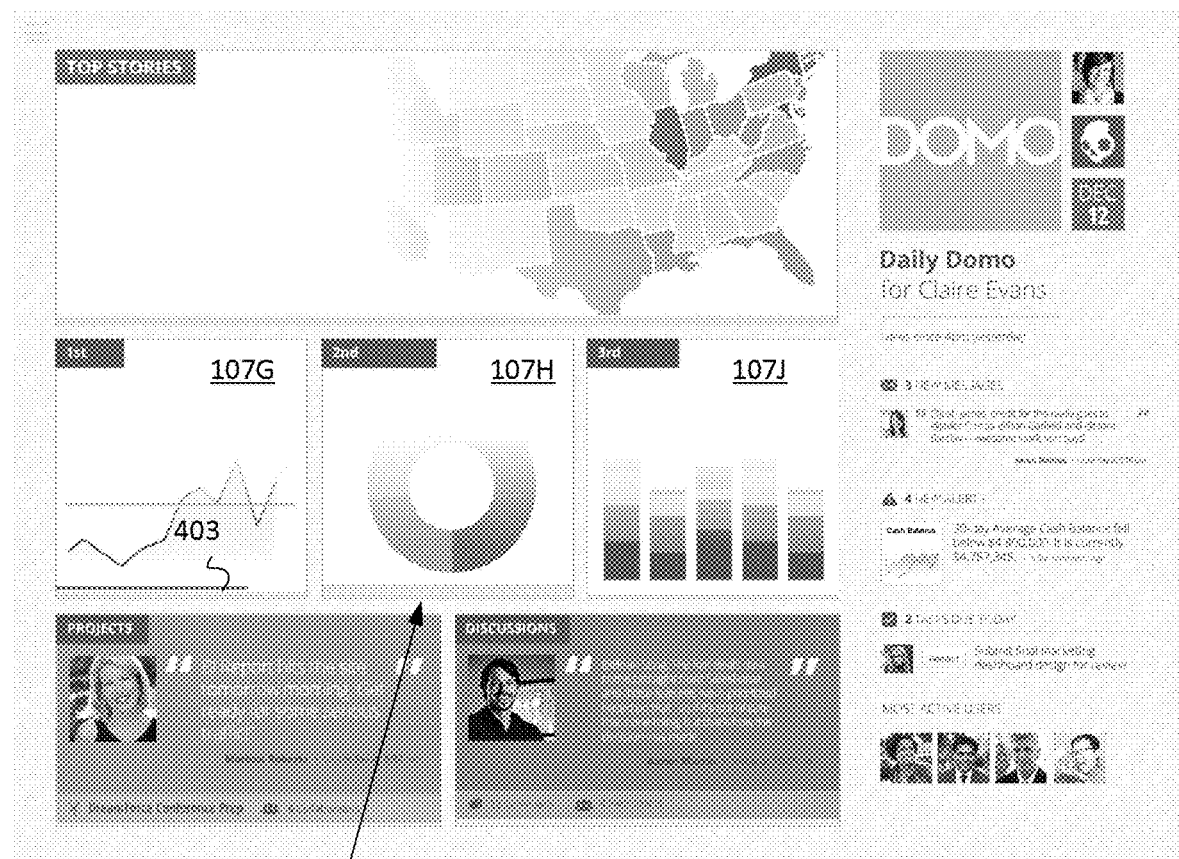

In FIG. 4D, the animation has concluded. Content item 107K has slid off the edge of display area 601 and is no longer displayed. Content items 107H and 107J have moved over to the second and third positions within display area 601, to make room for content item 107G. Since these three content items 107J, 107H, and 107J are the initial set of content items to be displayed in display area 601, the animation stops. To further reinforce the fact that the initial set of content items is now displayed, scroll indicator 403 is now in the leftmost position within display area 603.

In at least one embodiment, the animation presented in display area 601 has no effect on other content being displayed on the screen.

Example: Presentation of Web Content on a Mobile Device

Figure 5A:
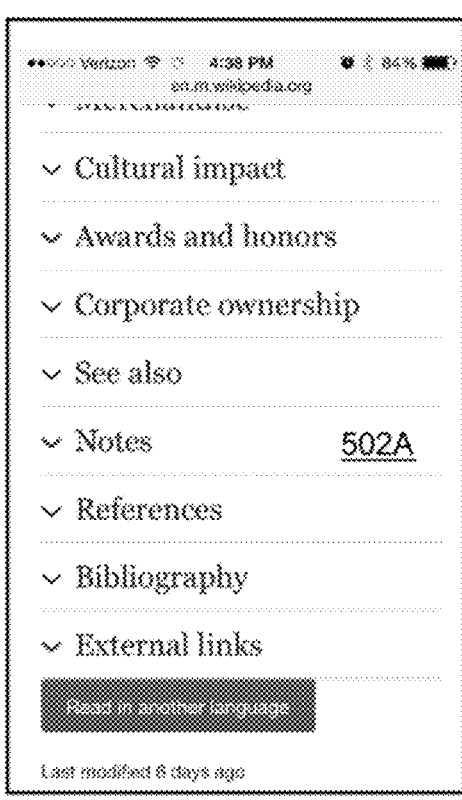
FIGS. 5A through 5H are screen shots depicting an example of operation of the present invention in a display of a web page on a mobile device, according to one embodiment.
Figure 5B:
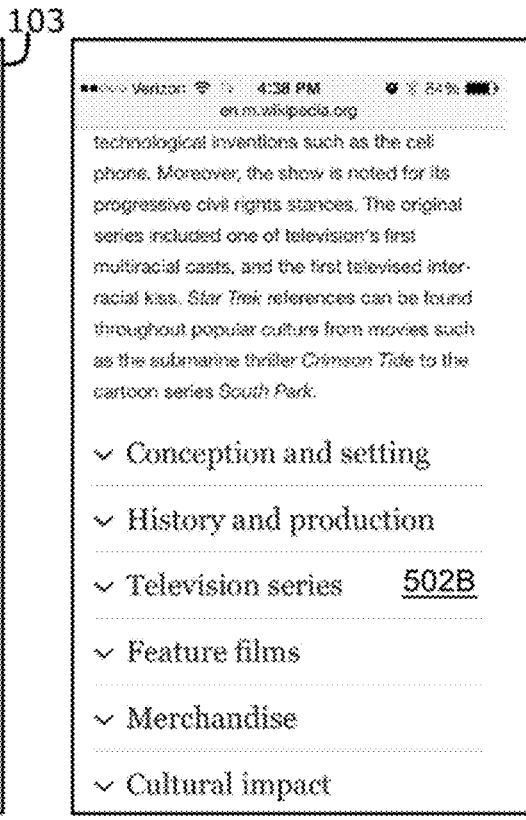
Figure 5C:
Figure 5D:
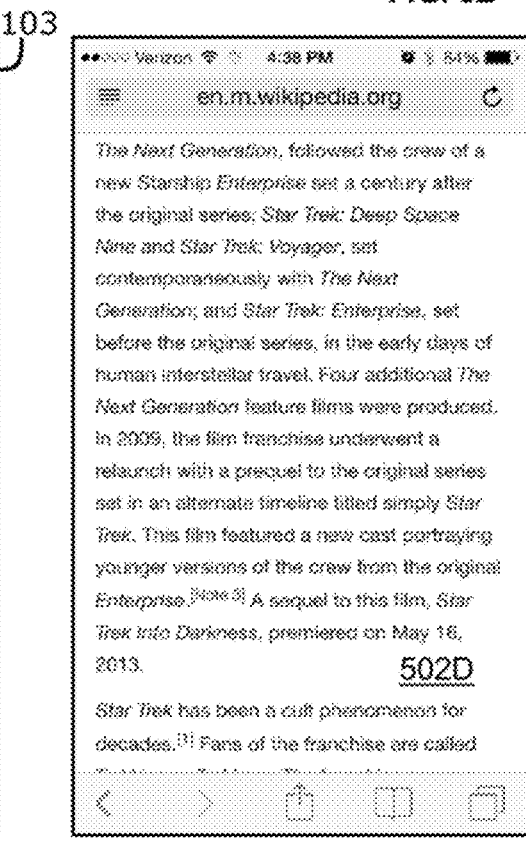
Figure 5E:
Figure 5F:
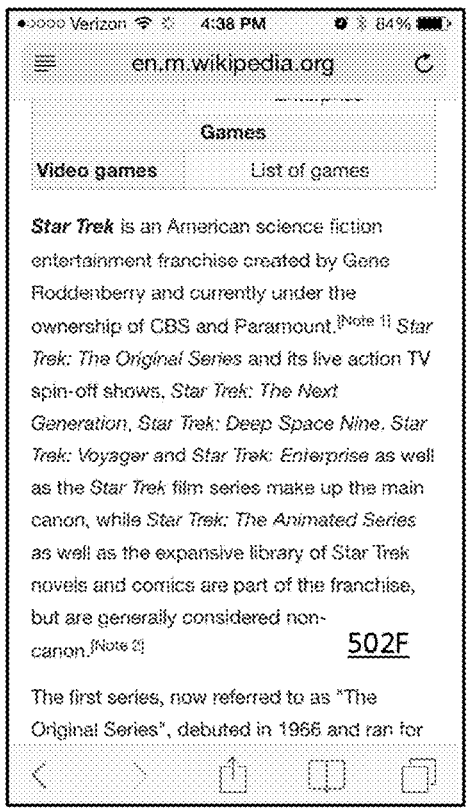
Figure 5G:
Figure 5H:

In at least one embodiment, the techniques of the present invention can be implemented in connection with web content being displayed in a browser or other software application. FIGS. 5A through 5H are screen shots depicting an example of operation of the present invention in a display of a web page on a display screen 103 of a mobile device, according to one embodiment. Here, the entire screen 103 constitutes the display area. In FIG. 5A, upon navigating to a web page, the user is initially presented with bottom portion 502A of the web page. In this case, the animation (step 306 of FIG. 3A) consists of a quick sliding motion from the bottom portion 502A of the web page, as shown in FIG. 5A, to the top portion 502H of the web page, as shown in FIG. 5H. In effect, this motion resembles an automatically activated scroll operation. In this example, the animation is performed smoothly, so that the system displays, in a transitory fashion, intermediate portions 502B through 502G of the web page, as shown in FIGS. 5B through 5G. As mentioned above, on completion of the animation, the initial content (here exemplified as portion 502H of the web page) is displayed, and the user can then scroll to other portions in a conventional manner.

One skilled in the art will recognize that these are merely examples of possible implementations of the invention. The particular type of animation, direction and/or axis of scrolling, and manner in which the web page (or other content) is presented, can all be changed without departing from the essential characteristics of the invention.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics of the invention.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment of the invention. The appearances of the phrases "in one embodiment" or "in at least one embodiment" in various places in the specification are not necessarily all referring to the same embodiment.

In various embodiments, the present invention can be implemented as a system or a method for performing the above-described techniques, either singly or in any combination. In another embodiment, the present invention can be implemented as a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the invention include: a mobile phone, personal digital assistant, smartphone, kiosk, server computer, enterprise computing device, desktop computer, laptop computer, tablet computer, consumer electronic device, or the like. An electronic device for implementing the present invention may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method for managing content display by a computing device, the method comprising:
  displaying content using a computing device, wherein displaying the content comprises:

determining that the content to be displayed within a display area of a display device of the computing device is scrollable in response to determining that a size of the content exceeds a size of the display area, the content having a scroll order comprising an initial scroll position; and before any user-initiated scrolling of the content within the display area is performed, causing a transitory animation to be displayed within the display area, the transitory animation comprising:

automatically displaying a first view of the content in the display area in response to opening the content, the first view corresponding to a selected scroll position, the selected scroll position excluding a subset of the content visible in the initial scroll position of the scroll order, and immediately transitioning to displaying a second view of the content in the display area in response to displaying the first view of the content in the display area, comprising transitioning from the selected scroll position to the initial scroll position in a reverse scroll order, wherein the transitory animation is configured to start and to end independently of user input to the computing device.

2. The method of claim 1, wherein the content comprises a plurality of content items, including a first content item corresponding to the initial scroll position and a last content item corresponding to a last scroll position in the scroll order.

3. The method of claim 1, wherein the content comprises an ordered sequence of content items.

4. The method of claim 1, wherein the transitory animation comprises a graphical animation that transitions from displaying the first view of the content in the display area to displaying the second view of the content in the display area.

5. The method of claim 4, wherein the transitory animation comprises automatically scaling content displayed within the display area from a first display scale to a second display scale.

6. The method of claim 4, wherein the content comprises a plurality of content items, the plurality of content items ordered linearly from a first content item to a last content item.

7. The method of claim 1, wherein the first view corresponds to a last scroll position in the scroll order, and wherein causing the transitory animation to be displayed further comprises displaying an intermediate view of the content in the display area between displaying the first view of the content and the second view of the content, the intermediate view corresponding to an intermediate scroll position between the first scroll position and the last scroll position in the scroll order.

8. The method of claim 1, wherein:

the content comprises a plurality of content items from a first content item to a last content item, and the first view comprises the last content item and excludes the first content item, and the second view comprises the first content item and excludes the last content item.

9. The method of claim 1, wherein the content comprises a web page.

10. The method of claim 1, wherein the content comprises a plurality of content items from a topmost content item to a bottom-most content item, wherein the first view comprises the bottom-most content item, and wherein the second view comprises the topmost content item.

11. The method of claim 1, further comprising selecting the scroll position for the first view of the content based on one or more of:

a desired duration of the transitory animation; and a desired maximum speed of the transitory animation.

12. The method of claim 1, wherein a display of the content at the initial scroll position is continuous with the end of the display of the transitory animation.

13. The method of claim 1, further comprising:

at the processor, determining whether a transitory animation has previously been displayed for the content;

wherein the step of causing the transitory animation to be displayed is performed responsive to a determination that the transitory animation has not previously been displayed for the content.

14. The method of claim 1, further comprising, subsequent to the transitory animation ending:

at an input device, receiving user input to scroll the content;

responsive to the user input, scrolling the content within the display area.

15. The method of claim 1, wherein the display area comprises at least one of a viewable area within a display screen of the display device, a window, a sub-region of a window, a virtual window, a sub-region of a virtual window, and a virtual pane within the display screen.

16. The method of claim 1, wherein the display area comprises an entire area of a display screen of the display device.

17. The method of claim 1, further comprising, responsive to user input during the transitory animation, interrupting the transitory animation and causing the transitory animation to end before a configured end to the transitory animation.

18. The method of claim 17, wherein the display device comprises a touch-sensitive screen, and wherein the user input comprises user contact with the touch-sensitive screen during the transitory animation.

19. The method of claim 1, wherein the first view of the content comprises a zoomed-out view of a first portion of the content, and wherein the second view of the content comprises a zoomed-in view of a second portion of the content.

20. A system for managing content display by a computing device, the system comprising:

a non-transitory storage medium storing content for display on a client computing device; and a server computing device configured to transmit the content to the client computing device via an electronic communication network, wherein the content comprises instructions configured for execution by the client computing device;

wherein, in response to the content being processed for display within a display area of the client computing device being too large for display in the display area, the instructions are configured to cause the client computing device to display a transitory animation prior to performing any user-initiated scrolling of the content within the display area, and wherein displaying the transitory animation comprises:

automatically displaying a first view of the content in the display area in response to opening the content, the first view corresponding to a selected scroll position of the content, the selected scroll position ordered after an initial scroll position of the content in a content scroll order and excluding a portion of the content visible in the initial scroll position, and transitioning to displaying a second view of the content within the display area upon displaying the first view of the content within the display area, the second view corresponding to the initial scroll position of the content such that the transitioning comprises automatically scrolling the content in a reverse of the content scroll order, wherein display of the transitory animation within the display area is initiated and terminated independently of user input to the client computing device.

21. The system of claim 20, wherein causing the client computing device to display the transitory animation comprises displaying a continuous transition from the first view to the second view within the display area.

22. The system of claim 21, wherein the selected scroll position corresponds to a last scroll position of the content.

23. The system of claim 21, wherein the content comprises a plurality of portions, the portions ordered linearly from a first portion of the content to a last portion of the content.

24. The system of claim 23, wherein the first view comprises the last portion of the content and the second view comprises the first portion of the content.

25. The system of claim 23, wherein the first portion comprises a first portion of a single content item and the second portion comprises a last portion of the single content item.

26. The system of claim 20, wherein:
the processor is further configured to determine whether a transitory animation has previously been displayed for the content;
and wherein the processor is configured to cause the client computing device to display the transitory animation in response to determining that the transitory animation for the content has not previously been displayed at the client computing device.

27. The system of claim 20, wherein the instructions are configured to terminate the transitory animation in response to a user input pertaining to the display area.

28. The system of claim 20, wherein the display area comprises at least one of a viewable area within a display screen of the client computing device, a window, a sub-region of a window, a virtual window, a sub-region of a virtual window, and a virtual pane within the display screen.

29. The system of claim 20, wherein the display area comprises an entire area of a display screen of the client computing device.

30. The system of claim 20, wherein the instructions are further configured to terminate the transitory animation and scroll the second view of the content within the display area in response to a user scroll input received during display of the transitory animation.

31. The system of claim 30, wherein the display area corresponds to a touch-sensitive display screen of the client computing device, and wherein the user scroll input comprises user contact with the touch-sensitive screen during display of the transitory animation within the display area.

32. The system of claim 20, wherein causing the display device to display the transitory animation further comprises:
displaying an intermediate view of the content within the display area between display of the first view and the second view, the intermediate view between the selected scroll position and the first scroll position in the scroll order.

33. A non-transitory computer program product comprising instructions for execution by a processor, execution of the instructions to cause the processor to perform operations for managing the display of content at a computing system, the operations comprising:
opening content for display in a display area of a display device of a computing system;
determining that the content is scrollable in response to determining that a size of the content exceeds a size of the display area, the content scrollable from an initial scroll position to a last scroll position; and
before any user scrolling of the content is performed within the display area, causing a transitory animation to be automatically displayed within the display area in response to the opening the content for display, the transitory animation comprising:
displaying a first view of the content within the display area, the first view corresponding to a selected scroll position after the initial scroll position in the scroll ordering of the content such that the first view excludes at least a portion of the content visible in the initial scroll position, and
transitioning to displaying a second view of the content within the display area in response to displaying the first view of the content, the second view corresponding to the initial scroll position of the content such that the transitioning comprises automatically scrolling the content in a reverse scroll direction,
wherein the transitory animation is initiated and terminated independently of user input to the computing system.

34. The computer program product of claim 33, wherein the transitory animation comprises a graphical animation that gradually transitions between display of the first view of the content to display of the second view of the content.

35. The computer program product of claim 34, wherein the transitory animation comprises transitioning from the first view of the content at a first scale to the second view of the content at a second scale in a continuous manner within the display area.

36. The computer program product of claim 34, wherein portions of the content are ordered linearly from an initial portion at the initial scroll position to a last portion at the last scroll position.

37. The computer program product of claim 36, wherein the first view comprises the last portion of the content, and wherein the second view comprises the initial portion of the content.

38. The computer program product of claim 36, wherein the initial portion and the last portion comprise first portions of a single content item.

39. The computer program product of claim 33, the operations further comprising:
determining whether a transitory animation has previously been displayed for the content on the display device of the computing system;
causing the transitory animation to be displayed within the display area in response to determining that the transitory animation has not previously been displayed for the content on the display device of the computing system.

40. The computer program product of claim 33, wherein the scroll position of the first view is selected based on one or more of:
a desired duration of the transitory animation; and
a desired speed of the transitory animation.

41. The computer program product of claim 33, wherein the display area comprises at least one of a viewable area within a display screen, a window, a sub-region of the window, a virtual window, a sub-region of the virtual window, and a virtual pane within the display screen.

42. The computer program product of claim 33, wherein the display area comprises an entire display screen of the display device.

43. The computer program product of claim 33, the operations further comprising interrupting the transitory animation and displaying the second view of the content in response to a user input pertaining to the display area received while causing the transitory animation to be displayed within the display area.

44. The computer program product of claim 43, wherein the display device comprises a touch-sensitive screen, and wherein the user input comprises user contact with the touch-sensitive screen during display of the transitory animation on the touch-sensitive screen.

45. The computer program product of claim 33, wherein causing the transitory animation to be displayed within the display area further comprises gradually scaling the content displayed within the display area.

46. The computer program product of claim 33, wherein a portion of the content disposed in the first view is included in the second view.

* * * * *